US006724339B2

(12) United States Patent
Conway et al.

(10) Patent No.: US 6,724,339 B2
(45) Date of Patent: Apr. 20, 2004

(54) SYSTEM AND METHOD FOR CONTROLLING HOME APPLIANCES

(75) Inventors: James N. Conway, Corona del Mar, CA (US); Patrick H. Hayes, Mission Viejo, CA (US)

(73) Assignee: Universal Electronics Inc., Cypress, CA (US)

( * ) Notice: Subject to any disclaimer, the term of this patent is extended or adjusted under 35 U.S.C. 154(b) by 458 days.

(21) Appl. No.: 09/808,708

(22) Filed: Mar. 14, 2001

(65) Prior Publication Data

US 2002/0130803 A1 Sep. 19, 2002

(51) Int. Cl.[7] .......................... G08C 19/12; H04L 17/02

(52) U.S. Cl. .................. 341/176; 340/825.72; 359/147; 348/735

(58) Field of Search ................................ 341/173, 176; 340/825.69, 825.72; 359/145, 147; 379/102.01, 102.03; 348/734

(56) References Cited

U.S. PATENT DOCUMENTS

| | | | | | |
|---|---|---|---|---|---|
| 4,807,052 | A | * | 2/1989 | Amano | 348/734 |
| 4,882,747 | A | * | 11/1989 | Williams | 379/102.03 |
| 4,899,370 | A | * | 2/1990 | Kameo et al. | 379/102.03 |
| 4,959,810 | A | | 9/1990 | Darbee et al. | |
| 5,138,649 | A | * | 8/1992 | Krisbergh et al. | 455/420 |
| 5,227,780 | A | | 7/1993 | Tigwell | |
| 5,228,077 | A | * | 7/1993 | Darbee | 379/102.01 |
| 5,631,652 | A | | 5/1997 | Lee | |
| 5,963,624 | A | | 10/1999 | Pope | |
| 6,181,255 | B1 | * | 1/2001 | Crimmins et al. | 340/825.69 |
| 6,249,673 | B1 | * | 6/2001 | Tsui | 455/92 |

FOREIGN PATENT DOCUMENTS

| | | | | |
|---|---|---|---|---|
| EP | 1109393 A1 | | 6/2001 | |
| GB | 2166322 A | * | 4/1986 | H04M/11/00 |
| WO | WO 89/11137 | | 11/1989 | |
| WO | WO 01/95283 A2 | | 12/2001 | |

OTHER PUBLICATIONS

Smart Corporation, System Overveiw for SmartOne–Integrated Home Control, pp 1–14.

General Electric, Home Control—House Macros: Total Home Control, www.ge–smart.com/living/homecontrol.asp, 1 page.

General Electric, Audio/Visual, www.ge–smart.com/selling/audiovideo.asp, 1 page.

Home toys Product Review, Home Tool Pro by Smart, www.hometoys.com/htinews/oct98/reviews/smartone/hometool.htm, 5 pages.

Full house Control Corporation, The RHOC (Remote Home Controller), www.cyrus.com/rhoc.html, 3 pages.

Full House Control Corporation, FHC (Full House Control), www.cyrus.com/about.html, 2 pages.

* cited by examiner

*Primary Examiner*—Timothy Edwards
(74) *Attorney, Agent, or Firm*—Mark R. Galis; Gary R. Jarosik

(57) ABSTRACT

A hand-held remote control which can be configured to communicate command codes to one or more home appliances of different makes, models, and manufacturers and a relay unit that can communicate with the remote control. The relay unit has a button that corresponds to a key on the remote control. When the button on the relay unit is activated, the relay unit signals the remote control. In response to the receipt of the signal indicating activation of the button or in response to activation of the key on the remote control, the remote control communicates to one or more of the home appliances those command codes that have been mapped to the key. Command codes are communicated to the home appliances using native communication protocols.

20 Claims, 7 Drawing Sheets

SYSTEM AND METHOD FOR CONTROLLING HOME APPLIANCES

BACKGROUND OF THE INVENTION

This invention relates generally to remote controls and, more particularly, relates to a system and method for using a remote control to control home appliances.

It is known in the art to use remote controls to control the operation of home appliances. Furthermore, it is known in the art to provide remote controls with macro command capabilities whereby one or more user selected control commands can be transmitted to one or more home appliances in response to activation of a single remote control key. By way of example, U.S. Pat. No. 5,959,751 to Darbee, et al., issued on Sep. 28, 1999 and entitled “Universal Remote Control Device,” discloses a remote control with programming that allows a user to define a sequence of operations that the remote control will perform in response to activation of a macro key on the remote control. The user defines the sequence of operations by placing the remote control into a macro definition mode and, thereafter, activating one or more keys on the remote control. When the macro key is subsequently activated, the remote control will perform the operations that have been assigned to the one or more keys that were activated during the macro definition mode. The operations performed by the remote control in response to activation of the macro key can include sending control commands to one or more home appliances for the purpose of controlling the operation of the home appliance (s).

It is also known in the art to use macro commands to control the operation of home appliances within an integrated control network. For example, the “Smart” line of products offered by General Electric provides a system for integrating existing home appliances, such as audio/video, heating and cooling, security, lighting, and other voltage products, into a control network. The integrated control network can be programmed to include “house macros” that allows multiple control commands to be issued to one or more home appliances attached to the network. The “house macro” control commands are issued to the home appliances in response to the activation of “smart switches” that are connected to the integrated control network.

To communicate control commands within the integrated control network, all of the products connected to the integrated control network must be capable of responding to and/or transmitting messages using the CEBus protocol. The CEBus protocol is the underlying protocol for the messages that are routed throughout the integrated control network. Message routing is performed by a system manager that has no direct physical connection to the home appliances. Rather, the system manager sends CEBus protocol messages to the home appliances over standard powerlines. Within the system manager is stored the programming for the system level functions (i.e., house macros, light scenes, master clock, etc.) that determine which control commands are transmitted to the home appliances residing on the network.

While integrated control networks do work for their intended purpose, they do suffer disadvantages. For example, the “Smart” line, integrated control network requires the use of “controllers” which respond to the CEBus messages to control the operation of home appliances that do not directly support CEBus protocol messaging. To this end, the home appliances are further required to be hard-wired to the “controllers.” Accordingly, since control of conventional home appliances can only be accomplished through the use of specialized devices and intricate hard-wiring, integrated control networks are not a practical solution to home control for those consumers that are cost conscious and/or not technically savvy.

SUMMARY OF THE INVENTION

To overcome these problems, the subject invention is directed to improved system and method for controlling home appliances. Generally, the system includes a hand-held remote control which can be configured to communicate command codes to one or more home appliances of different makes, models, and manufacturers and a relay unit that can communicate with the remote control. The relay unit has a button that corresponds to a key on the remote control. When the button on the relay unit is activated, the relay unit signals the remote control. In response to the receipt of the signal indicating activation of the button or in response to activation of the key on the remote control, the remote control communicates to one or more of the home appliances those command codes that have been mapped to the key. Command codes are communicated to the home appliances using native communication protocols.

A better understanding of the objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF THE DRAWINGS

For a better understanding of the invention, reference may be had to a preferred embodiment shown in the following drawings in which.

DETAILED DESCRIPTION

Figure 1:
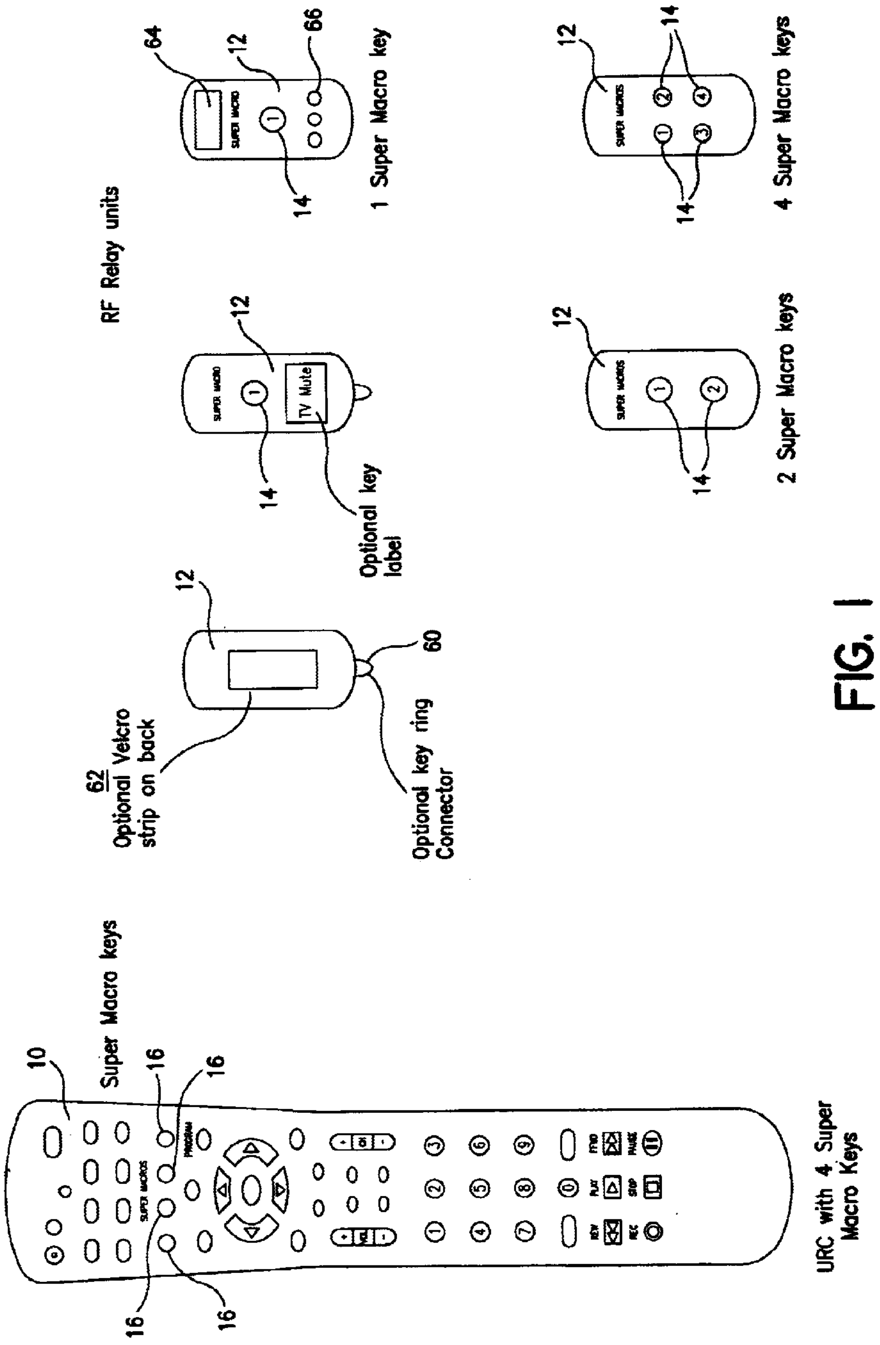
FIG. 1 illustrates an exemplary system including relay units in communication with a remote control having command codes for use in controlling the operation of home appliances.

Turning now to the figures, wherein like reference numerals refer to like elements, there is illustrated a system and method for controlling the operation of one or more home appliances. The system includes a remote control 10 and relay units 12 that include one or more buttons 14 as illustrated in FIG. 1. Each of the buttons 14 corresponds to one of the command keys on the remote control 10. While the command key can be a simple key such as “MUTE,” it is preferred that the command key be a user definable macro key 16. As will be described in greater detail hereinafter, activation of a button 14 on a relay unit 12 will cause the remote control 10 to perform the operations that have been assigned to the key that corresponds to the activated button 14. These operation will typically include the transmitting of one or more command codes to one or more home appliances for the purpose of controlling the operation of the home appliance(s).

Figure 4:
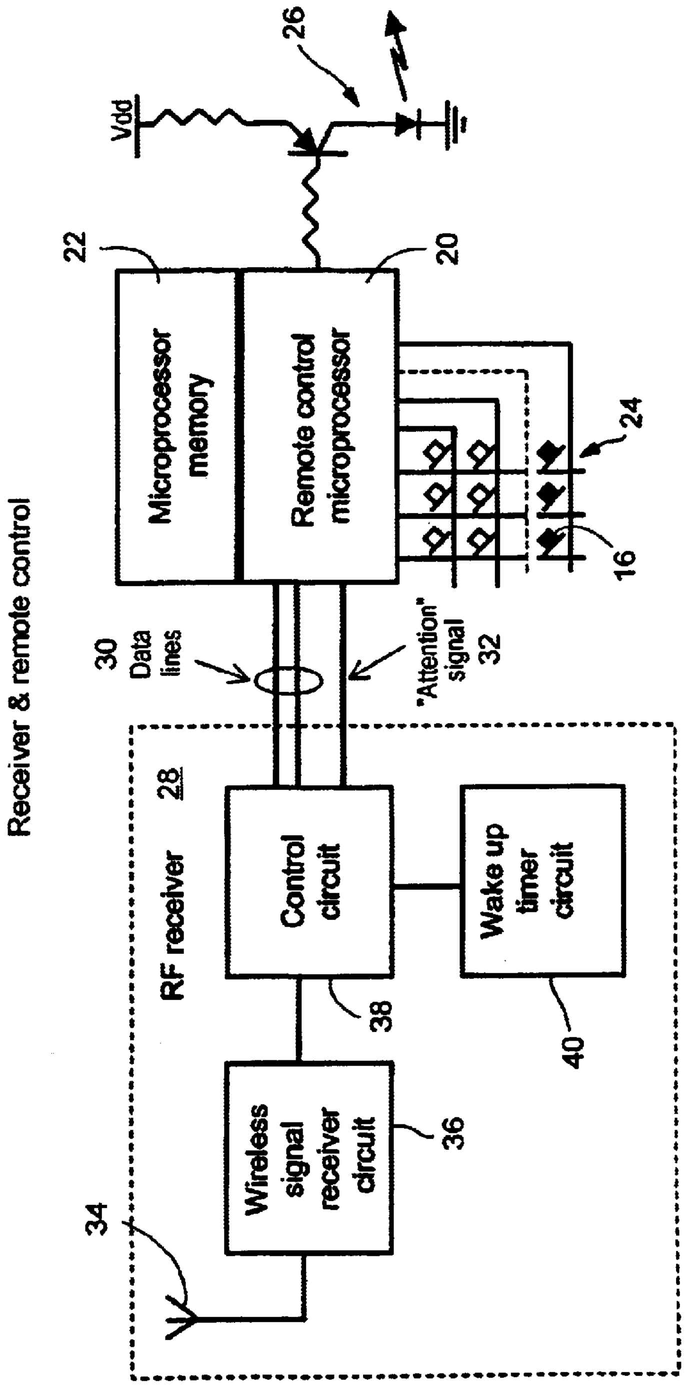
FIG. 4 illustrates a block diagram of an exemplary embodiment of the remote control of FIG. 1.

For commanding the operation of the home appliance(s), the remote control 10, illustrated in FIG. 4, is adapted to transmit command codes to remotely controllable home appliances. To this end, the remote control 10 includes a microprocessor 20 that is in communication with a memory 22, a keypad 24, and an infrared ("IR") transmitter 26. The keypad 24, comprised of a plurality of keys, is coupled to the microprocessor 20 for, among other things, allowing the user to command the operation of the remote control 10. The keypad keys include number keys, function keys, mode keys, and macro keys 16. While described in the context of physical keys on the remote control 10, the keypad 24 can be implemented virtually using touch screens or the like.

To control the operation of the remote control 10 itself, the memory 22 includes executable instructions that are intended to command the operation of the microprocessor 20. The executable instructions allow the microprocessor 20 to control the various electronic components within the remote control 10, e.g., to control power, to cause the transmission of command codes, etc. It will be appreciated that the memory 22 may be comprised of any type of computer-readable media, such as ROM, RAM, SRAM, FLASH, EEPROM, or the like. Preferably the memory 22 comprises non-volatile forms of memory such as ROM, Flash, or battery-backed SRAM such that programmed and user entered data is not required to be reloaded after battery changes. Furthermore, the memory 22 may take the form of a chip, a smart card, a hard disk, a magnetic disk, and/or an optical disk.

For communicating with different types of home appliances from different manufacturers, the memory 22 also includes a command code library. The command code library is comprised of a plurality of command codes that may be transmitted from the remote control 10 directly to a home appliance to control the operation of the home appliance (e.g., to cause a TV to mute, to change a CD track, etc.). In connection with the stored command codes, the memory 22 includes instructions and data which the microprocessor 20 uses to cause the IR transmitter 26 to transmit the command codes in a format that is recognized by identifiable home appliances. As described in U.S. Pat. No. 4,959,810, which is incorporated herein by reference in its entirety, a user may enter data into the remote control 10 that serves to identify home appliances by type and manufacturer such that the remote control 10 is adapted to transmit the appropriate command codes in the appropriate format for such identified home appliances. Alternatively, a user may "teach" the remote control the codes of another unit as described in U.S. Pat. No. 4,626,848 to Ehlers issued Dec. 2, 1986 which is also incorporated herein by reference in its entirety. Combinations of these two techniques are also possible.

For commanding the remote control to perform an operation in accordance with the executable instructions, the user may activate one or more keys on the keypad 24. In this regard, certain of the keys are mapped to certain of the executable instructions stored within the memory 24. The executable instructions may cause the remote control 10 to transmit command codes to one or more home appliances in accordance with the data the user has entered to setup the remote control or has taught the remote control 10 in response to activation of a key. Home appliances that are especially adapted for remote control include TVs, VCRs, DVD players, thermostats, fans, entry systems, computers, etc. The executable instructions can also be used to perform local operations on the remote control itself in response to activation of a key. Examples of local operation include favorite key setup, macro key setup, etc.

To perform macro key setup in accordance with the local operations of the remote control 10, the remote control 10 includes executable instructions that are used to place the remote control 10 into a macro entry definition mode. Again, as described in U.S. Pat. No. 5,959,751 which is incorporated herein by reference in its entirety, the macro entry definition mode allows a user to define a sequence of operations that the remote control will perform in response to activation of a selected one of the macro keys 16. To this end, once the user has placed the remote control 10 in the macro entry definition mode, the user defines a sequence of operations and identifies the macro key 16 to which the sequence of operations are to be assigned. The sequence of operations may be defined by activating one or more command/function keys on the remote control 10. When the macro key 16 that was the subject of the macro entry definition mode is subsequently activated, the remote control 10 will perform the operations that have been defined for the macro key 16.

For further commanding the remote control 10 to perform an operation in accordance with the executable instructions, the remote control 10 is adapted to respond to command signals that are transmitted to the remote control 10 by the relay units 12. To receive the command signals, the remote control 10 includes a radio frequency ("RF") receiver 28 which is in communication with the microprocessor 20 by way of data lines 30 and interrupt line 32. The RF receiver 28 includes an RF antenna 34, a wireless signal receiver circuit 36, a control circuit 38, and a wakeup timer 40. Since the operation of the RF receiver 28 is described in detail in commonly owned U.S. Pat. Nos. 5,638,050 and 5,686,891, which are incorporated herein by reference in their entirety, it will not be described herein for the sake of brevity.

Figure 2:
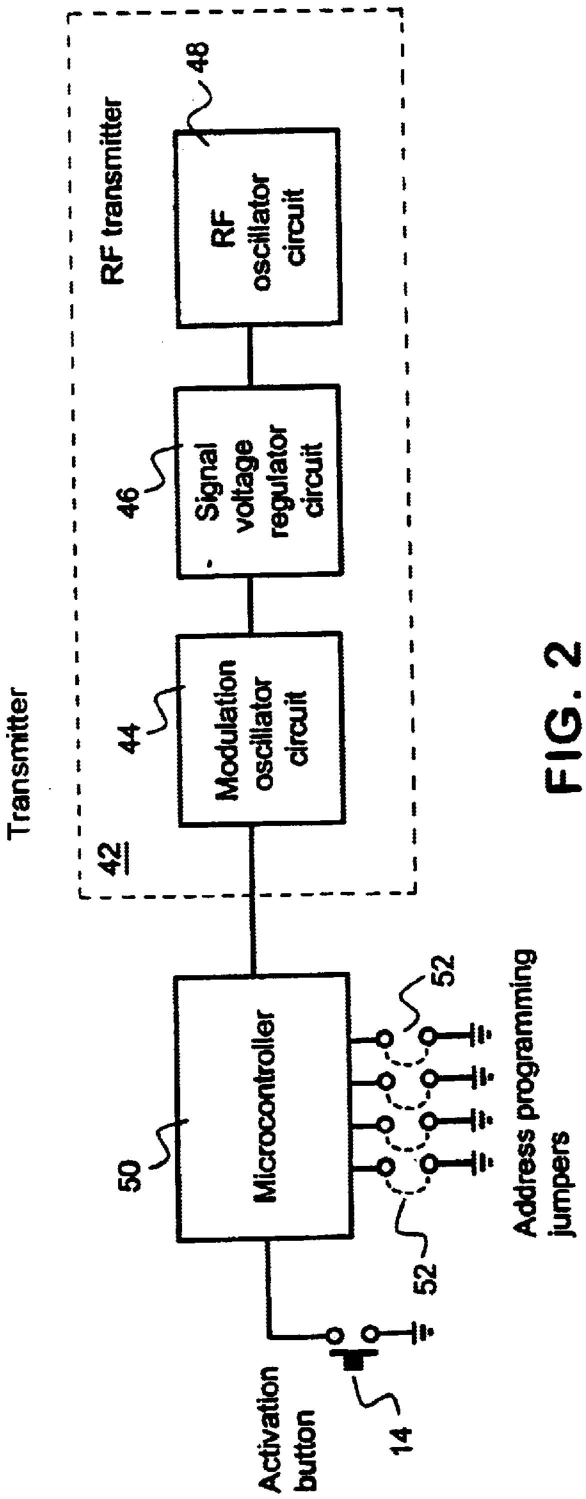
FIG. 2 illustrates a block diagram of an exemplary embodiment of the relay units of FIG. 1.

To transmit the command signals to the remote control 10, which command signals are sent in response to activation of a button 14 on the relay units 12, the relay units 12 include an RF transmitter 42 as illustrated in FIG. 2. The RF transmitter 42 includes a modulation oscillator circuit 44, a signal voltage regulator circuit 46 and an RF oscillator circuit 48 as well as a RF antenna. The RF transmitter 42 is under the control of a microcontroller 50 which is in communication with the button(s) 14. The microcontroller 50 also includes a memory having the instructions and data necessary to allow the RF transmitter 42 to communicate the command signals to the remote control 10. Since the operation of the RF transmitter 42 is also described in detail in commonly owned U.S. Pat. Nos. 5,638,050 and 5,686,891, it will not be described herein for the sake of brevity.

Figure 3:
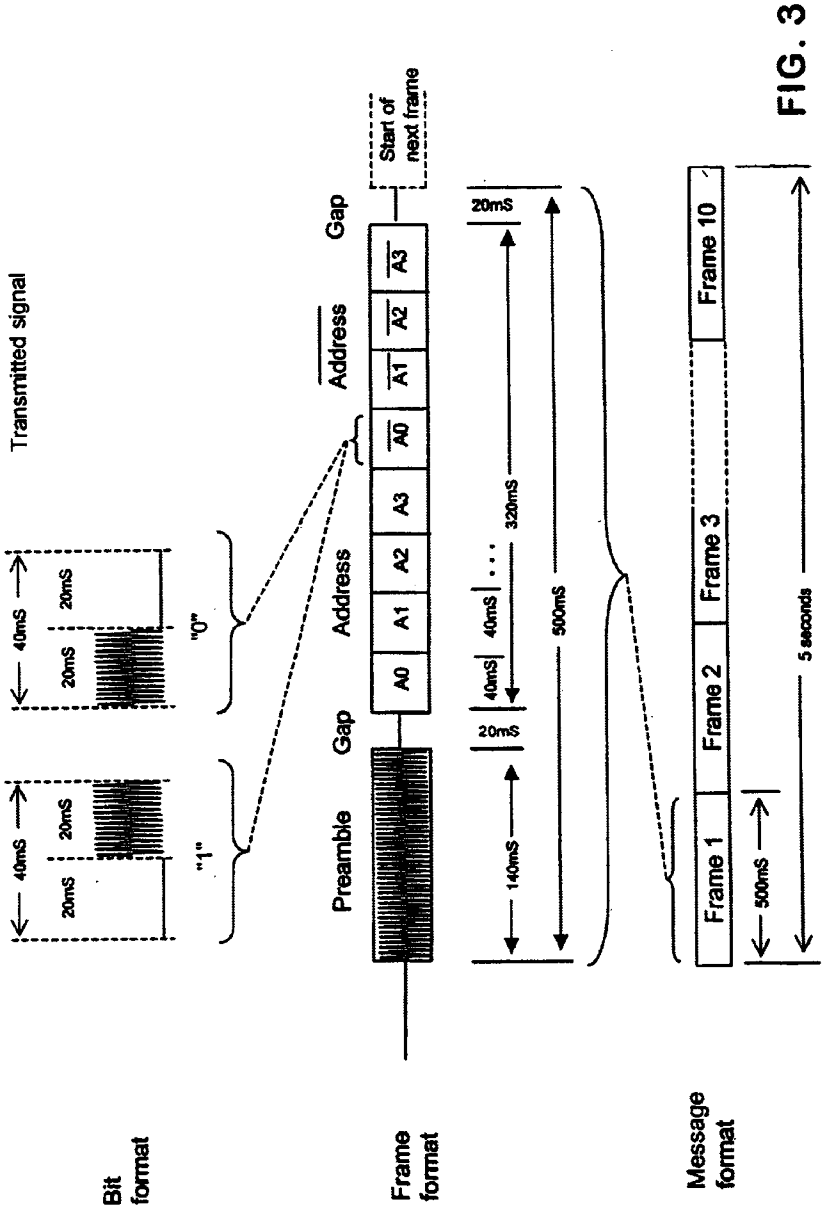
FIG. 3 illustrates an exemplary signal format for use in communicating with the remote control of FIG. 1.

For communicating the command signals to the remote control 10, the relay units 12 preferably use a "Manchester" bit encoding schema. The "Manchester" encoding schema is preferred since a carrier signal is present for each bit of data transmitted, i.e., without regard to whether the bit has a value of "0" or "1." Thus, use of the "Manchester" encoding schema ensures that there is never a period of longer than some predetermined time during the transmission that a carrier signal is not present. By way of example, as illustrated in FIG. 3, the longest time period that could occur without a carrier during signal transmission would be 40 mS when the bit codes "0" followed by "1" are transmitted. As will be described in greater detail hereinafter, the use of the "Manchester" encoding schema is particularly useful as it allows the remote control 10 to wake up periodically to check for a command signal transmission from the relay units 12.

Since the "Manchester" bit encoding schema also guarantees that there is never any period longer than a predetermined time during the signal transmission that a bit signal is present, a burst of carrier which is longer than the predetermined time can be used as a transmission preamble. Again, by way of example and as illustrated in FIG. 3, the longest time period that could occur with a bit signal transmission would be 40 mS when the bit codes "1" followed by "0" are transmitted. Thus, a burst of carrier for longer than 40 mS (e.g., 140 mS) can be used to unambiguously flag to the remote control 10 the start of each data frame that is being transmitted from a relay unit 12.

To inform the remote control 10 which button 14 was activated, the command signal transmitted to the remote control 10 from the relay unit 12 preferably includes a 4 bit address. In this regard, each of the buttons 14 will have a unique address associated therewith. In the embodiment shown this address comprises two bits of button number information (i.e. up to four distinct buttons) and two bits of "system" code (i.e. up to four distinct systems). The purpose of the "system" code is to permit the co-existence of multiple remote controls which are within RF range of one another—for example in adjacent homes or offices, or even several independent units in the same home. The address can be preset or could be configured by the user by way of jumpers or switches 52 as illustrated in FIG. 2. It will be appreciated that while a 4-bit address is used in the embodiment shown, in the event more than four buttons or more than four system codes are required the number of bits in the address can easily be extended as appropriate.

For causing the remote control to perform an operation in response to the receipt of a command signal transmitted by the relay units 12, the remote control 10 includes programming that examines the 4-bit addresses received and, if the system code portion matches the value assigned to the remote, maps the button number portion of the address to selected operations of the remote control 10. In the preferred embodiment, the addresses are mapped to the operation(s) that have been defined to the macro keys 16. Accordingly, upon receipt of a command signal, the remote control will perform the operation(s) that were defined for the macro key 16 that corresponds to the address in the signal transmitted. These operations can include the transmission of one or more command codes from the remote control 10 to one or more of the home appliances.

Figure 5:
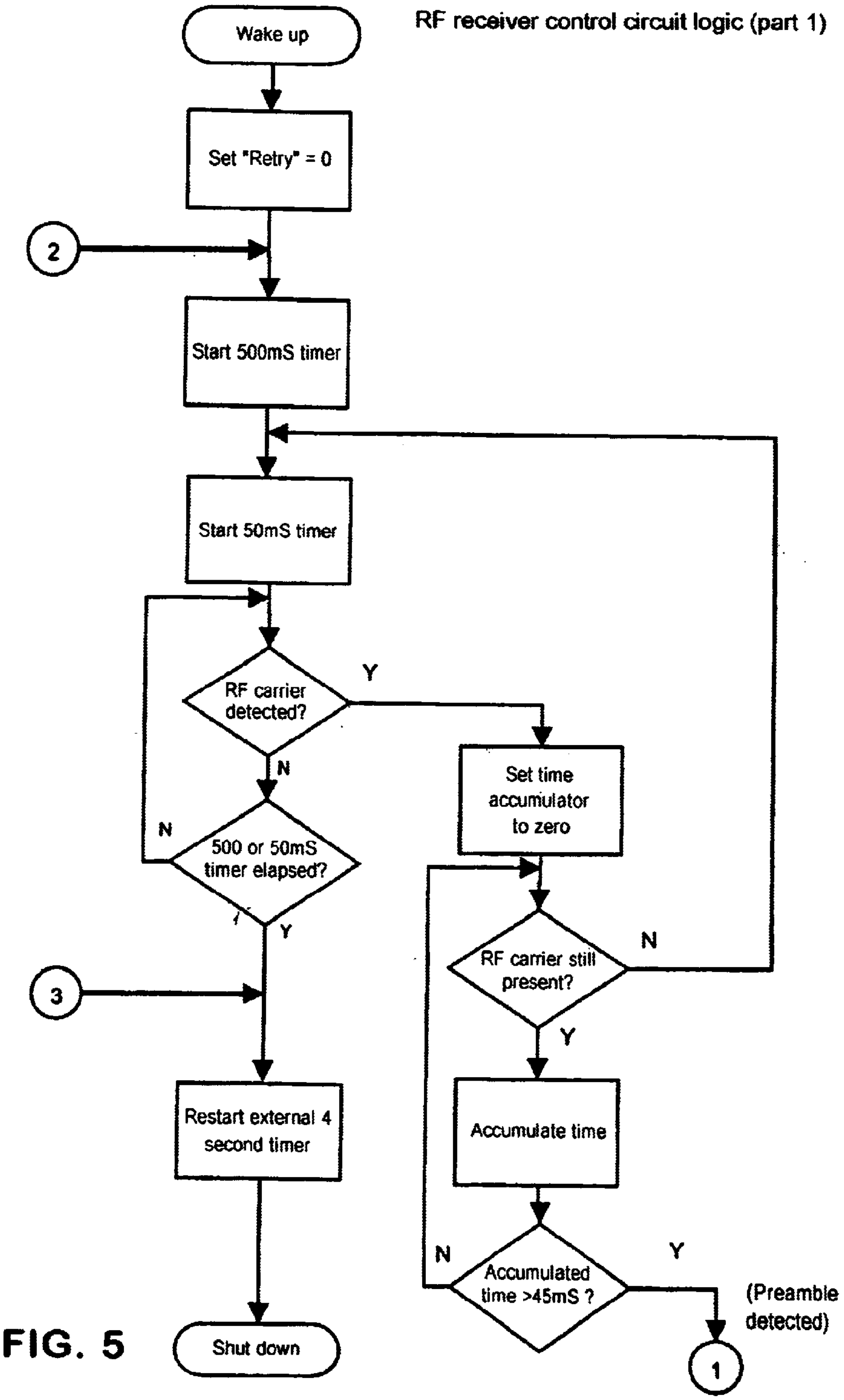
FIGS. 5–7 illustrate flow chart diagrams of an exemplary method for controlling the operation of home appliances.
Figure 6:
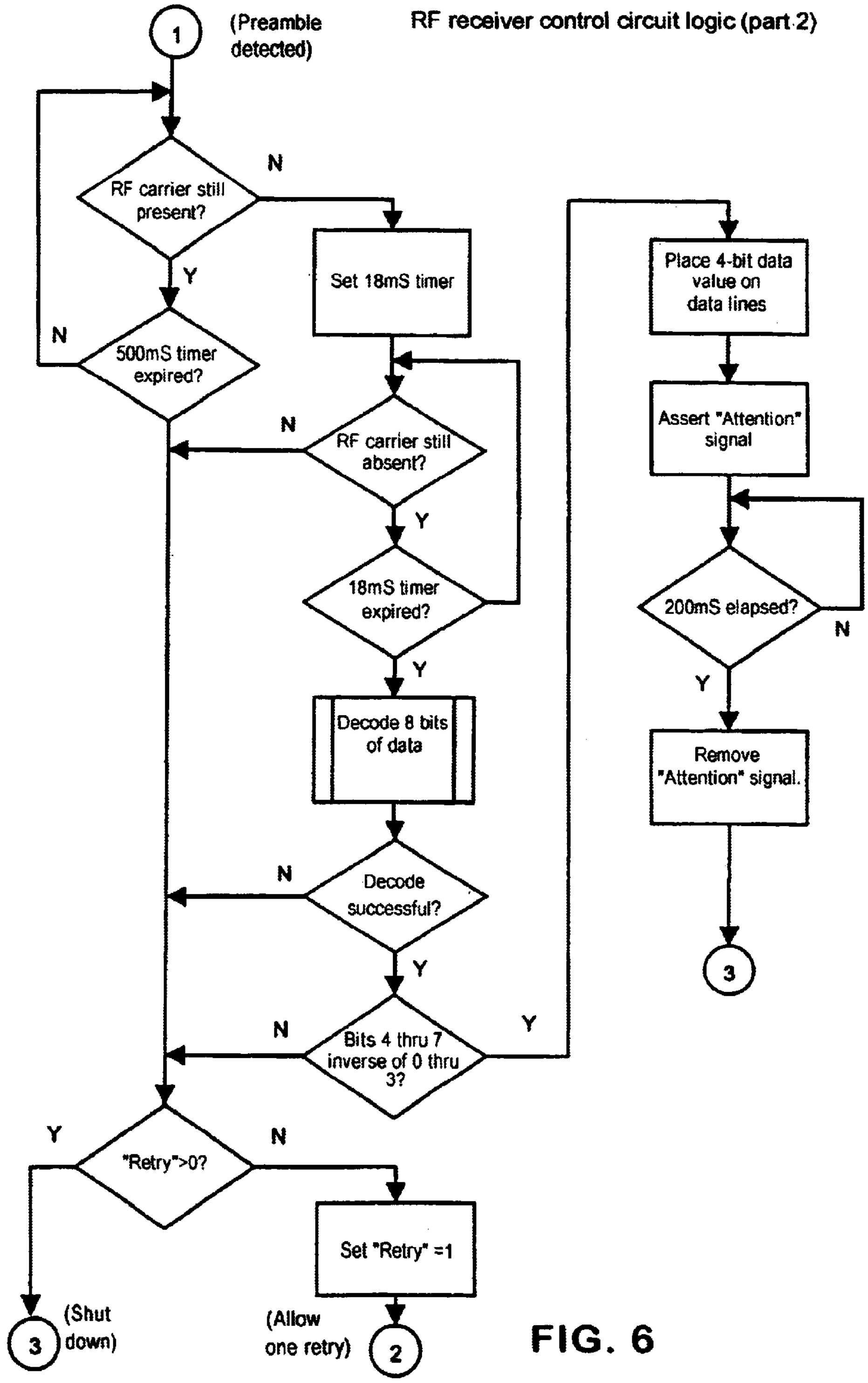
Figure 7:
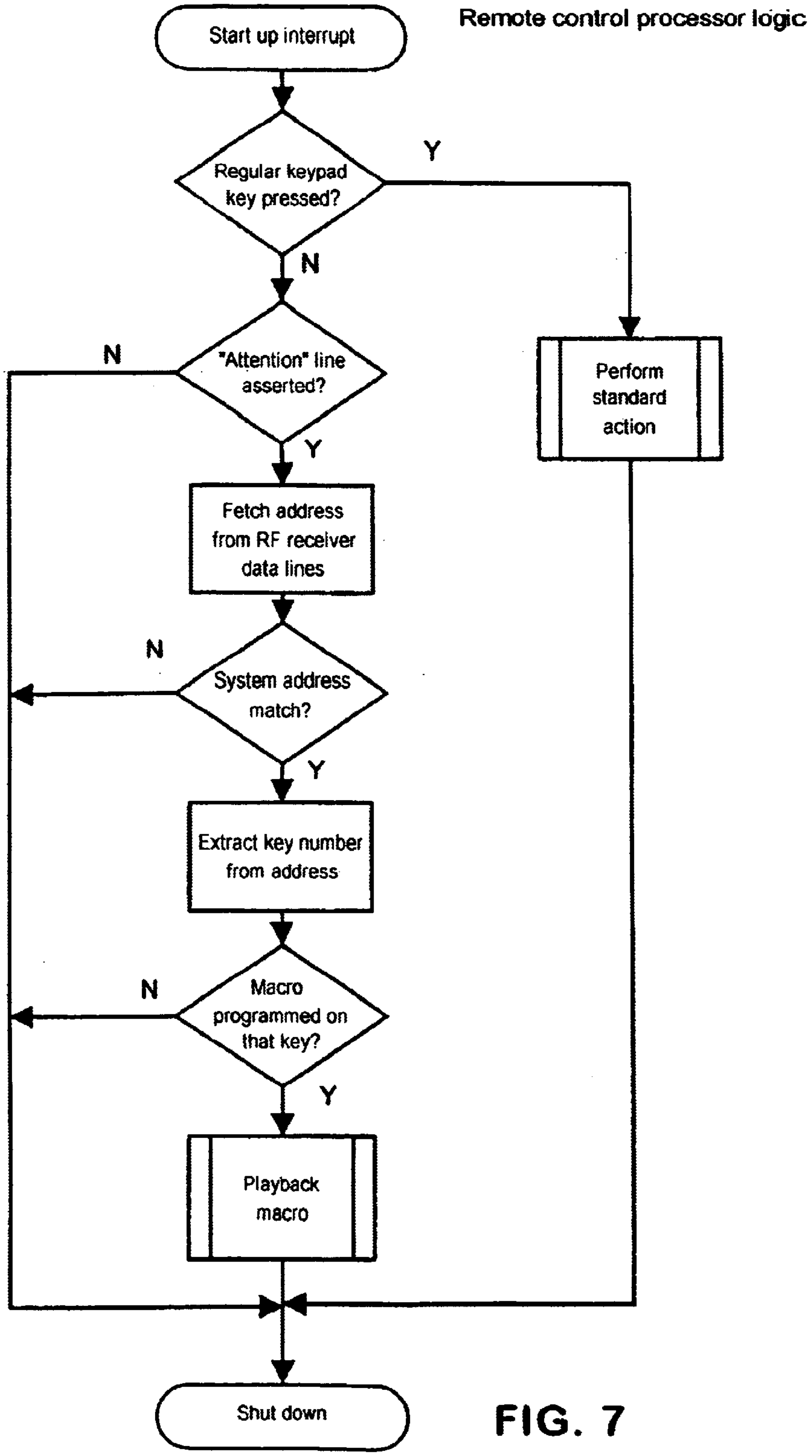

By way of further example, with reference to FIGS. 5–7, when a button 14 is activated on one of the relay units 12, the relay unit 12 transmits to the remote control 10 a five second long command signal. The command signal contains ten identical frames each of which includes address data comprising a system code and the identity of the button 14 that was activated, e.g., "1" when button "1" is activated. Each data frame also includes a preamble burst which enables the RF receiver 28 to synchronize with the command signal transmission.

To detect the transmission of a command signal, the RF receiver 28 is caused to wake up once every four seconds. The four second time frame is used as it allows at least one complete frame of data to be received no matter where in the transmission cycle the RF receiver 28 awakes. When the RF receiver 28 wakes up, if a command signal is not detected within 50 mS the remote control 10 goes back to sleep and waits for the next wake up interrupt. If, however, the RF receiver 28 detects the transmission of the command signal, the RF receiver 28 begins to monitor for an RF carrier signal of longer than 45 mS which indicates the presence of the preamble.

If the RF carrier signal currently being monitored goes away in less than 45 mS, the RF receiver 28 assumes that the signal was a data pulse (i.e., an address bit) and the RF receiver 28 continues to monitor for a new RF carrier signal which is expected within 50 mS. When an RF carrier signal of longer than 45 mS is detected, then a preamble burst is present and the RF receiver 28 synchronizes itself to the end of the preamble burst. If no preamble burst is detected within 500 mS, or if at any time there is a 50 mS gap with no RF activity, an error condition is determined to be present within the system.

Once the RF receiver 28 is synchronized with the command signal, the RF receiver decodes the address data and the error check data embedded within the command signal. If the address data is successfully decoded and no error condition exists, the address data is latched to the data lines 30 and an interrupt signal is sent to the microprocessor 20 on interrupt line 32. Upon receiving an interrupt signal, the microprocessor 20 responds according to whether the interrupt was generated as a result of activation of a key on the keypad 24 or as a result of signal reception by the RF receiver 28.

If the interrupt was generated in response to activation of a key, the microprocessor 20 causes the remote control 10 to perform the operation(s) that have been mapped/assigned to the activated key. If, however, the interrupt was generated by the RF receiver 28, the microprocessor 20 reads the address information from the data line 30. If the system code portion of the address matches that of the remote control, the microprocessor 20 uses the button number information from the address to cause the remote control 10 to perform the operation(s) that have been mapped/assigned to the address in the received command signal. In the preferred embodiment, since the addresses are mapped to the operation(s) that have been defined for the macro keys 16, the microprocessor 20 will cause the remote control 10 to perform the same operation(s) as if the macro key 16 corresponding to the address was directly activated. In this example, the remote control 10 would perform the operation (s) that were assigned to macro key "1."

For the convenience of the user, the relay units 12 are particularly adapted to be carried on a key chain and or attached to a wall. In this manner, the user can communicate with the remote control 10 to control the operation of home appliances at various locations within the household. For attachment to a key chain, the relay units 12 can include an optional key ring connector 60. For removable attachment to a wall, the relay units 12 can include a "velcro" strip 62 that is adapted to engage a fabric strip that is adhered to the wall. The relay units 12 can also include flanges with openings by which the relay units 12 can be mounted to the wall using fasteners such as nails or screws.

Furthermore, correspondence between the buttons 14 on the relay units 12 and the keys of the remote control 10 can be indicated to the user by way of labels that are placed on the buttons 14 and the keys (e.g., labels "1" through "4"). The labels can be preprinted on the buttons and/or keys. Alternately, printed labels can be adhered to the relay units 12 and/or the remote control 10. It will also be appreciated that, while described in the context of physical keys on the relay unit 12, the buttons 14 can be implemented virtually using touch screens or the like. Similarly, while the relay units are described in the context of self-contained devices, it will be appreciated that these may also be built into other items from which access to pre-defined home appliance functions is desired, for example a cordless telephone handset, a nightstand, an alarm clock, etc.

To command the operation of home appliances when the user is away from the household, the relay units 12 can be equipped with simple timers such as kitchen timers. In this regard, the user can program a count down time or time of day at which time the command signal will be transmitted to the remote control 10. For this purpose, the relay unit will include a timer display 64 and buttons 66 for programming the timer and for informing the relay unit 12 which address is to be included in a transmitted command signal, i.e., if more than one button 14 and/or address is supported by the relay unit 12.

As will be appreciated from the foregoing description, the subject system and method for controlling home appliances has the advantage of providing a low cost solution to home appliance control. Specifically, the subject system and method does not require the use of specialized communications modules that need to be hardwired to conventional home appliances. This desirable result arises from the use of the remote control 10 which is adapted to communicate with the home appliances through free space using signal formats that conventional home appliances already recognize.

While specific embodiments of the invention have been described in detail, it will be appreciated by those skilled in the art that various modifications and alternatives to those details could be developed in light of the overall teachings of the disclosure. For example, it will be appreciated that a single processor can be used to control the operations of the remote control 10 including all of the functions associated with the RF receiver 28. Accordingly, the particular arrangement disclosed is meant to be illustrative only and not limiting as to the scope of the invention which is to be given the full breadth of the appended claims and any equivalents thereof.

What is claimed is:

1. A system for controlling the operation of a home appliance, comprising:

a hand-held remote control having a keypad including a plurality of keys, a memory for storing a command code library for use in commanding the operation of the home appliance and programming for mapping command codes from the command code library to keys of the keypad, a radio frequency receiver circuit, and an infrared transmission circuit; and a relay unit including a button corresponding to a key of the keypad and a radio frequency transmission circuit for sending a radio frequency command signal to the remote control in response to activation of the button, the radio frequency command signal including data identifying the button;

wherein, in response to the reception of the radio frequency command signal by the radio frequency receiver circuit, the remote control uses the data identifying the button to cause the infrared transmission circuit to transmit to the home appliance a command code from the command code library that is mapped to the key of the keypad that corresponds to the button.

2. The system as recited in claim 1, wherein the radio frequency command signal is encoded using a Manchester encoding schema.

3. The system as recited in claim 1, wherein the radio frequency receiver circuit includes a wakeup timer for causing the remote control to periodically listen for a transmission of the radio frequency command signal.

4. The system as recited in claim 1, wherein the button corresponds to a user-definable macro key to which multiple command codes from the command code library are mapped.

5. The system as recited in claim 1, wherein the relay unit is adapted to be attached to a key chain.

6. The system as recited in claim 1, wherein the relay unit is adapted to be mounted to a wall.

7. The system as recited in claim 1, wherein the relay unit includes a timer for causing the radio frequency transmission circuit to transmit the radio frequency command signal.

8. The system as recited in claim 1, wherein the relay unit is built into an alarm clock.

9. The system as recited in claim 1, wherein the relay unit is built into a phone handset.

10. The system as recited in claim 1, wherein the relay unit is built into a piece of furniture.

11. The system as recited in claim 1, wherein the radio frequency command signal includes data identifying the hand-held remote control.

12. A system for controlling the operation of a plurality of different home appliance of different manufacturers, comprising:

a hand-held remote control having a keypad including a macro key, a memory for storing a command code library for use in commanding the operation of each of the home appliances and programming for mapping one or more command codes from the command code library to the macro key of the keypad, a radio frequency receiver circuit, and an infrared transmission circuit; and a relay unit including a button corresponding to the macro key of the keypad and a radio frequency transmission circuit for sending a radio frequency command signal to the remote control in response to activation of the button;

wherein, in response to the reception of the radio frequency command signal by the radio frequency receiver circuit or activation of the macro key, the remote control causes the infrared transmission circuit to transmit to the home appliances the one or more command codes from the command code library that the user mapped to the macro key of the keypad.

13. The system as recited in claim 12, wherein the keypad includes a plurality of macro keys and the programming allows a user to map one or more command codes from the command code library to each of the macro keys, the relay unit includes a plurality of buttons each of which corresponds to one of the macro keys of the keypad, the radio frequency command signal includes data identifying which one of the plurality of buttons was activated to cause the transmission of the radio frequency command signal, and the remote control uses the data identifying which one of the plurality of buttons was activated to cause the infrared transmission circuit to transmit to the home appliances the one or more command codes from the command code library that the user mapped to the macro key of the keypad that corresponds to the one of the plurality of buttons activated.

14. A readable media having executable instructions for use in controlling the operation of a hand-held remote control adapted to communicate command codes to a plurality of different home appliances of different manufacturers using a communication protocol native to each of the home appliances, the executable instructions performing steps comprising:

accepting input by which selected command codes from the plurality of command codes are mapped to keys on the hand-held remote control;

accepting input by which one or more of the mapped command codes are assigned to a macro key on the hand-held remote control;

determining if the macro key has been activated;

determining if a command signal transmission that identifies the macro key has been received; and if it is determined that the macro key has been activated or the command signal transmission that identifies the macro key has been received, communicating to one or more of the home appliances the command codes assigned to the macro key using the native communication protocol of the home appliance that is a target of each command code communicated.

15. The readable media as recited in claim 14, wherein the instructions perform the step of transmitting an infrared signal to each of the home appliances.

16. The readable media as recited in claim 14, wherein the instructions perform the step of waking the remote control to periodically determine if the command signal is being transmitted.

17. The readable media as recited in claim 14, wherein the instructions perform the step of extracting the identifying data from the command signal.

18. A readable media having executable instructions for use in controlling the operation of a hand-held remote control adapted to communicate command codes to a first home appliance using a first communication protocol and a second home appliance using a second communication protocol different than the first communication protocol, the executable instructions performing steps comprising:

accepting input by which a first command code for controlling the operation of the first home appliance and a second command code for controlling the operation of the second home appliance are assigned to a single macro key on the hand-held remote control;

determining if the macro key has been activated;

determining if a command signal transmission that includes data that identifies the macro key has been received; and if it is determined that the macro key has been activated or the command signal transmission that identifies the macro key has been received, communicating to the first home appliance the first command code using the first communication protocol and communicating to the second home appliance the second command code using the second communication protocol.

19. A hand-held remote control unit, comprising:

a keypad having a plurality of keys including a macro key;

a memory storing a plurality of command codes for use in commanding the operation of a plurality of different home appliances;

a radio frequency receiver circuit;

an infrared transmission circuit; and programming for mapping a subset of the plurality of command codes to the plurality of keys, for mapping a subset of the subset of the plurality of command codes to the macro key, for causing the infrared transmission circuit to transmit infrared signals corresponding to the subset of the subset of the plurality of command codes when the radio frequency receiver circuit detects a radio transmission that includes data identifying the macro button, and for causing the infrared transmission circuit to transmit infrared signals corresponding to the subset of the subset of the plurality of command codes in response to activation of the macro button.

20. A system for controlling the operation of a home appliance, comprising:

a radio frequency transmission having a first data structure containing data that identifies a hand-held remote control and a second data structure containing data that identifies a key on the hand-held remote control; and an infrared transmission having a third data structure containing data representing at least one command for controlling the operation of the home appliance wherein the infrared transmission originates from the hand-held remote control identified by the data in the first data structure and the data representing at least one command for controlling the operation of the home appliance is the same data that is transmitted by the hand-held remote control in response to activation of the key on the hand-held remote control identified by the data in the second data structure.

* * * * *